(12) United States Patent
Olfers et al.

(10) Patent No.: US 11,267,375 B2
(45) Date of Patent: Mar. 8, 2022

(54) INFANT CARRIER

(71) Applicant: Dorel Juvenile Group, Inc., Foxboro, MA (US)

(72) Inventors: Dennis Olfers, AV Leende (NL); Robért Sjang Josine Van Dijk, Eindhoven (NL); Sander Gerardus Toonders, Valkenswaard (NL)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 16/938,196

(22) Filed: Jul. 24, 2020

(65) Prior Publication Data
US 2021/0009013 A1 Jan. 14, 2021

Related U.S. Application Data

(63) Continuation-in-part of application No. 16/922,302, filed on Jul. 7, 2020.
(60) Provisional application No. 62/937,845, filed on Nov. 20, 2019, provisional application No. 62/904,105, filed on Sep. 23, 2019, provisional application No. 62/878,429, filed on Jul. 25, 2019.

(30) Foreign Application Priority Data

Jul. 10, 2019 (NL) .................................. 2023469

(51) Int. Cl.
*A47D 13/02* (2006.01)
*B60N 2/28* (2006.01)
(52) U.S. Cl.
CPC ......... *B60N 2/2845* (2013.01); *B60N 2/2821* (2013.01); *B60N 2/2806* (2013.01)

(58) Field of Classification Search
CPC ... B60N 2/2806; B60N 2/2845; B60N 2/2821
USPC ........ 297/183.1, 183.2, 183.3, 183.4, 184.13
See application file for complete search history.

(56) References Cited

U.S. PATENT DOCUMENTS

| 6,017,088 | A | * | 1/2000 | Stephens | ................ A47D 13/02 297/256.16 X |
| 6,517,153 | B1 | * | 2/2003 | Brewer | .................... A47C 7/66 297/184.13 X |
| 6,715,828 | B1 | | 4/2004 | Cheng | |
| 6,910,696 | B2 | * | 6/2005 | Bargery | ............... B60N 2/2845 280/30 |
| 6,913,313 | B2 | | 7/2005 | Sedlack | |

(Continued)

FOREIGN PATENT DOCUMENTS

| DE | 102004049919 A1 | 4/2006 |
| EP | 1591307 A2 | 11/2005 |

(Continued)

OTHER PUBLICATIONS

Netherlands Search Report for Netherlands App. No. NL2023469 dated Mar. 3, 2020, DN-139 NL, 7 pages.

(Continued)

*Primary Examiner* — Rodney B White
(74) *Attorney, Agent, or Firm* — Barnes & Thornburg LLP

(57) ABSTRACT

An infant carrier is included in a child restraint that may also include a carrier-mount base adapted to be anchored to a passenger seat in a vehicle. The infant carrier includes a shell for holding an infant and a carry handle coupled to the shell and adapted to be gripped by a caregiver.

20 Claims, 9 Drawing Sheets

(56) References Cited

U.S. PATENT DOCUMENTS

| | | |
|---|---|---|
| 7,488,034 B2 | 2/2009 | Ohren |
| 7,597,396 B2 | 10/2009 | Longenecker |
| 8,714,639 B2 | 5/2014 | Heisey |
| 8,911,015 B2 * | 12/2014 | Cohen .................. B60N 2/2812 297/256.16 |
| 8,998,312 B2 | 4/2015 | Sellers |
| 9,056,567 B2 | 6/2015 | Wuerstl |
| 9,066,610 B2 | 6/2015 | Duan |
| 9,771,007 B2 | 9/2017 | Shellenberger |
| 10,028,592 B1 | 7/2018 | Ruiz |
| 10,220,734 B2 * | 3/2019 | Cohen .................. B60N 2/2812 |
| 2010/0225150 A1 | 9/2010 | Duncan |
| 2010/0230933 A1 * | 9/2010 | Dean ....................... B62B 7/142 280/647 |
| 2010/0231019 A1 * | 9/2010 | Berkey ................ A47D 1/0081 297/256.1 |
| 2015/0266399 A1 * | 9/2015 | Lake .................... B60N 2/2821 297/256.12 |
| 2017/0065098 A1 | 3/2017 | Taylor |
| 2018/0334059 A1 * | 11/2018 | Churilla .................. B62B 9/203 |
| 2021/0023969 A1 * | 1/2021 | Coakley ............... B60N 2/2872 |

FOREIGN PATENT DOCUMENTS

| | | |
|---|---|---|
| EP | 1969974 B1 | 9/2008 |
| EP | 1974988 B1 | 10/2008 |
| EP | 2108566 B1 | 10/2009 |
| EP | 2210768 B1 | 7/2010 |
| GB | 2429401 A | 2/2007 |

OTHER PUBLICATIONS

Netherlands Search Report for Netherlands App. No. NL2023470 dated Mar. 4, 2020, DN-139 NL, 7 pages.

* cited by examiner

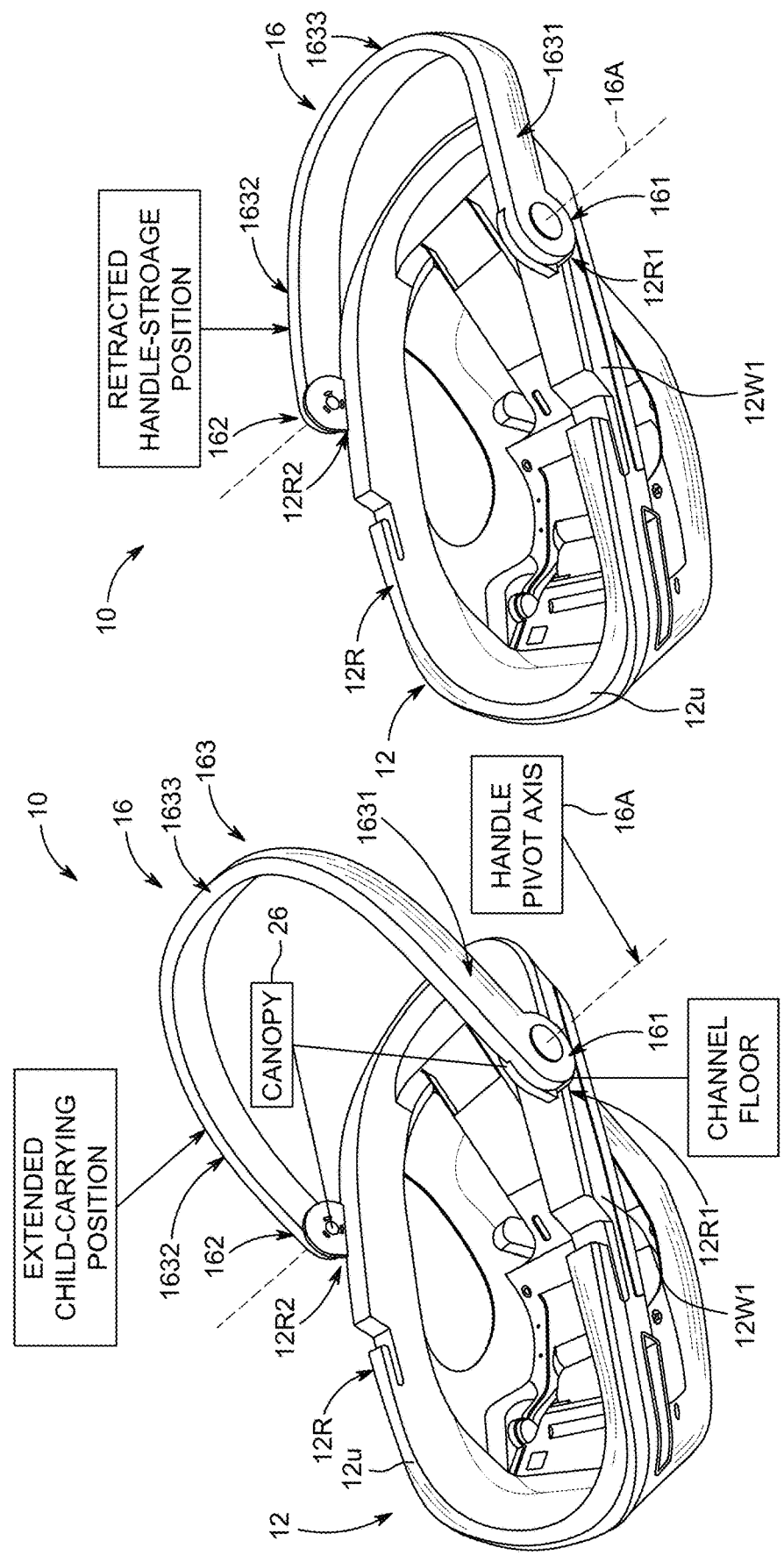

INFANT CARRIER

PRIORITY CLAIM

This application claims priority under 35 U.S.C. § 119(e) to U.S. Provisional Application No. 62/878,429, filed Jul. 25, 2019, U.S. Provisional Application No. 62/904,105, filed Sep. 23, 2019, U.S. Provisional Application No. 62/937,845, filed Nov. 20, 2019, and is a continuation-in-part of U.S. application Ser. No. 16/922,302, filed Jul. 7, 2020, which claims priority to Dutch Patent Application No. 2023469, filed Jul. 10, 2019, each of which is expressly incorporated by reference herein.

BACKGROUND

The present disclosure relates to child restraints, and particularly to child restraints that are used to restrain infant children. More particularly, the present disclosure relates to infant carriers that may be mounted on a base in a vehicle and that can be separated from the base and used by a caregiver to carry the infant away from the vehicle.

SUMMARY

A child restraint in accordance with the present disclosure includes an infant carrier. In illustrative embodiments, the infant carrier can be mounted on a stationary carrier-mount base that is anchored to a passenger seat in a vehicle or tethered to the passenger seat using vehicle lap and shoulder belts to restrain an infant seated in the infant carrier during transport in the vehicle. The infant carrier also can be separated from the carrier-mount base or the vehicle lap and shoulder belts to allow a caregiver to transport the infant seated in the infant carrier away from the vehicle using a carry handle included in the infant carrier.

In illustrative embodiments, the infant carrier includes a carrier shell and a U-shaped carry handle. The carrier shell provides a space for supporting an infant. The carry handle is mounted on the carrier shell for pivotable movement about a handle-pivot axis between an extended child-carrying position and a retracted handle-storage position. The carrier shell includes alcoves formed in a perimeter rim for receiving opposite handle ends of the carry handle so that at least substantial portions of those handle ends are inset in the perimeter rim to minimize contact with the leg or body of a caregiver carrying the infant carrier.

In illustrative embodiments, portions of each handle end of the pivotable U-shaped carry handle lies within a companion perimeter alcove formed in the carrier shell when the U-shaped carry handle is pivoted to assume the extended child-carrying position without protruding substantially beyond the side of the carrier shell that is adjacent to the companion perimeter alcove. Portions of the handle end lies within the perimeter alcove so that it does not substantially project outwardly beyond the side of the carrier shell to hit the leg or body of a caregiver holding the carry handle to transport an infant restrained in the carrier shell.

In illustrative embodiments, the carrier shell includes a top rim that is arranged to extend along an upper perimeter of the carrier shell. The top rim includes an outwardly facing exterior side wall that is conceived of as generally straight. A first perimeter alcove is sized to receive a portion of the first handle end of the pivotable carry handle and is formed by an indentation in the top rim and the outwardly facing exterior side wall of the top rim of the carrier shell so that the first handle end remains substantially within an outermost width of the carrier shell without protruding laterally outwardly beyond the outwardly facing exterior side wall of the top rim in a way that would cause the first handle end to hit the adjacent leg or body of a caregiver holding the carry handle to transport an infant restrained in the carrier shell.

In illustrative embodiments, the first handle end of the carry handle is a first pivot hub that is mounted on one side of the carrier shell in the first perimeter alcove for rotation about the handle-pivot axis. The carry handle also includes a second handle end that provides a second pivot hub mounted on an opposite side of the carrier shell in a second perimeter alcove for rotation about the handle-pivot axis. The carry handle further includes a U-shaped bail coupled to each of the first and second pivot hubs to rotate therewith. Each pivot hub remains in its companion perimeter alcove when the carry handle occupies the extended child-carrying position without projecting laterally outwardly beyond an adjacent side of the carrier shell to hit or rub against the leg or body of a caregiver that is carrying the infant carrier.

In illustrative embodiments, the bail includes a first grip-support arm coupled to the first pivot hub to rotate therewith, a second grip-support arm coupled to the second pivot hub to rotate therewith, and a handgrip arranged to interconnect free ends of the first and second grip-support arms. A caregiver can move the handgrip in a first direction toward a head end of the carrier shell to pivot the carry handle in a first direction about the handle-pivot axis to assume the retracted handle-storage position in which the U shaped bail extends around the head-end of the carrier shell. Alternatively, the caregiver can move the handgrip in an opposite direction away from the head end of the carrier shell to pivot the carry handle in a second direction about the handle-pivot axis to assume the extended child-carrying position in which the U shaped bail extends upwardly over the infant-supporting space formed in the carrier shell to allow the caregiver to hold the carry handle by the handgrip and transport an infant placed in the infant-supporting space of the carrier shell.

In illustrative embodiments, each handle pivot hub includes a handle-hub mount, a gear lock housed within the handle-hub mount, and an actuator button configured to move the gear lock from a locked position to a freed position. In the locked position, gear teeth included in the gear lock mesh with handle-hub teeth included in the handle-hub mount to block rotation of the carry handle about the carry-handle pivot axis. In the freed position, the gear lock is moved by the actuator button to disengage from the handle-hub teeth so that the carry handle may pivot about the carry-handle pivot axis between the retracted handle-storage position and the extended child-carrying position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 2 is a rear perspective view of the infant carrier of FIG. 1 showing the carry handle in an extended child-carrying position that is arranged to extend upwardly away from the endless rim of the carrier shell and showing that the first hub is located in the first handle-receiver channel above a channel floor defining a lower boundary of the first handle-receiver channel;

FIG. 3 is a perspective view similar to FIG. 2 showing the carry handle after it has been pivoted about a handle-pivot axis by a caregiver to assume a retracted handle-storage position and showing that the first hub remains in an inset position in the first handle-receiver channel without protruding substantially beyond the adjacent outwardly facing exterior side wall of the endless rim of the child carrier;

DETAILED DESCRIPTION

Figure 1:
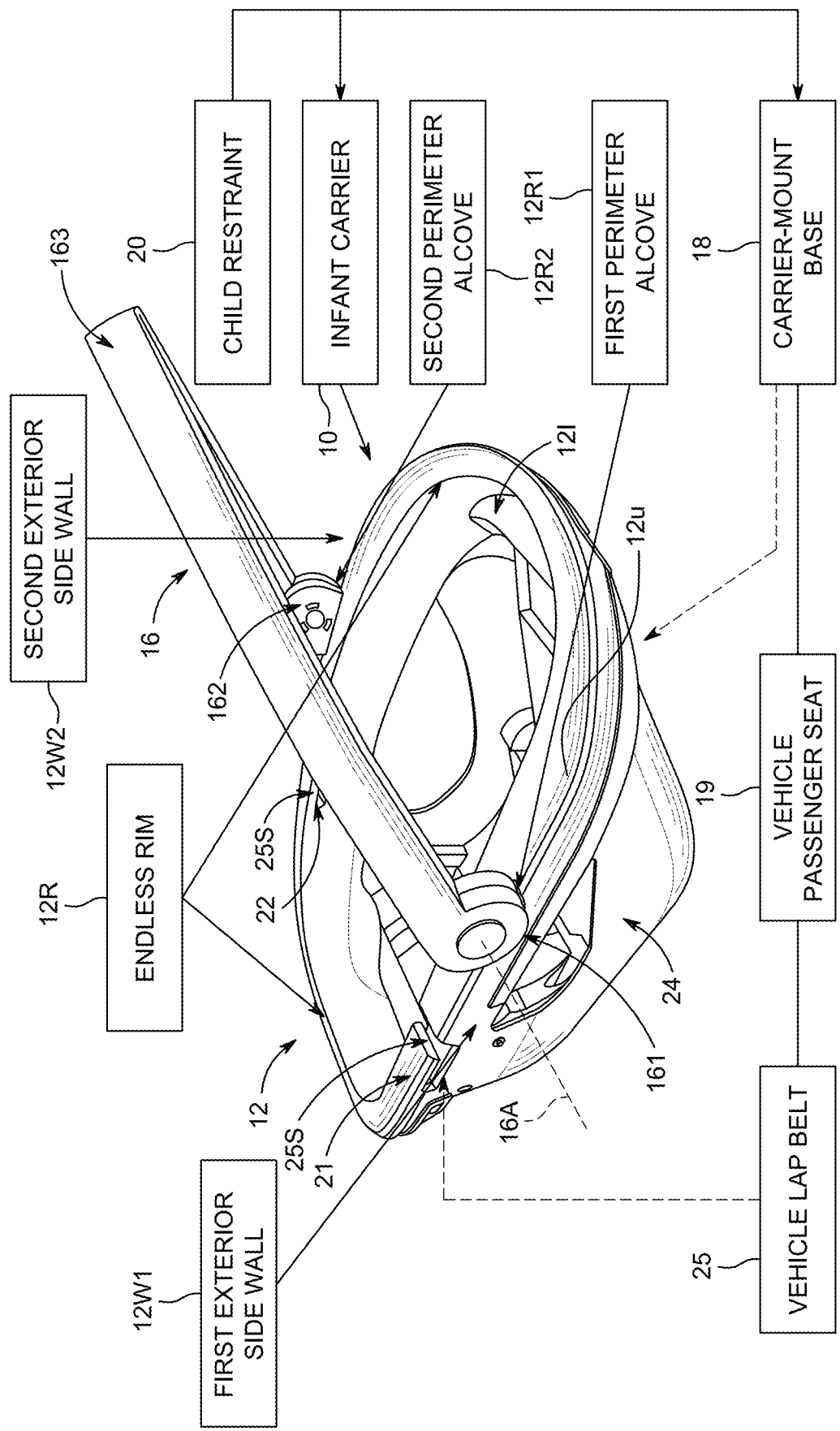
FIG. 1 is a front perspective view of a child restraint including an infant carrier in accordance with a first embodiment of the present disclosure showing that a portion of a first hub of a carry handle is inset in a first perimeter alcove provided by a first handle-receiver channel formed in an endless rim of a carrier shell so that an outwardly facing exterior side face of the first hub lies in the first handle-receiver channel minimizing protrusion beyond an adjacent outwardly facing exterior side wall of the endless rim.

An infant carrier 10 in accordance with a first embodiment of the present disclosure includes a carrier shell 12, an infant support 14 configured to fit in an interior region 121 of carrier shell 12 to hold an infant (not shown) placed in carrier shell 12, and a carry handle 16 mounted on carrier shell 12 for pivotable movement about a handle pivot axis 16A as shown in FIG. 1. First and second handle ends 161, 162 of the carry handle 16 are positioned to lie in companion first and second alcoves 12R1, 12R2 formed in a top perimeter rim 12R of carrier shell 12 when carry handle 16 is moved to assume an upright extended child-carrying position as suggested in FIGS. 1 and 5.

Infant carrier 10 may be mounted by a caregiver in any suitable manner on a carrier-mount base 18 that is anchored in a stationary position on a vehicle passenger seat 19 to provide a child restraint 20 as suggested diagrammatically in FIG. 1. Infant carrier 10 and carrier-mount base 18 cooperate to form a child restraint 20 as suggested in FIG. 1. Alternatively, infant carrier 10 can be retained on a vehicle passenger seat 19 using a vehicle lap belt 25 passing through first and second belt receivers 21, 22 included in carrier shell 12 in accordance with the present disclosure without using carrier-mount base 18. Infant carrier 10 can be separated from carrier-mount base 18 or otherwise decoupled from vehicle lap belt 25 so that the caregiver can use carry handle 16 to transport an infant restrained on infant support 14 in carrier shell 12 away from a passenger seat 19 in a vehicle (not shown). First and second belt receivers 21, 22 are mounted in the top perimeter rim 12R that is included in a shell body 24 that is also included in carrier shell 12.

First and second belt receivers 21, 22 are inset into cut-outs formed in shell body 24 and mated with shell body 24 to form carrier shell 12 as suggested in FIG. 1. Each belt receiver 21, 22 is formed to include a belt-path slot 25S for receiving a portion of vehicle lap belt 25 so that lap belt 25 anchors infant carrier 10 to vehicle passenger seat 19 when infant carrier 10 is desired to be restrained on vehicle passenger seat 19 without using carrier-mount base 18.

Infant carrier 10 includes a carrier shell 12 and a U-shaped carry handle 16 as shown in FIG. 1. Carrier shell 12 provides a space 121 for supporting an infant (not shown). Carry handle 16 is mounted on carrier shell 12 for pivotable movement about a handle pivot axis 16A between an extended child-carrying position shown in FIGS. 1 and 2 and a retracted handle-storage position shown in FIG. 3. Carrier shell 12 includes recesses formed in a perimeter rim 12R to provide first and second alcoves 12R1, 12R2 for receiving opposite handle ends 161, 162 of carry handle 16 so that substantial portions of handle ends 161, 162 are inset in the perimeter rim 12R to minimize contact with the leg or body of a caregiver carrying the infant carrier 10. Each handle end 161, 162 of the pivotable U-shaped carry handle 16 lies within a companion perimeter alcove 12R1 or 12R2 formed in carrier shell 12 when the U-shaped carry handle 16 is pivoted to assume the extended child-carrying position without protruding substantially beyond the side of carrier shell 12 that is adjacent to the companion perimeter alcove 12R1, 12R2 as suggested in FIG. 5.

Figure 5:
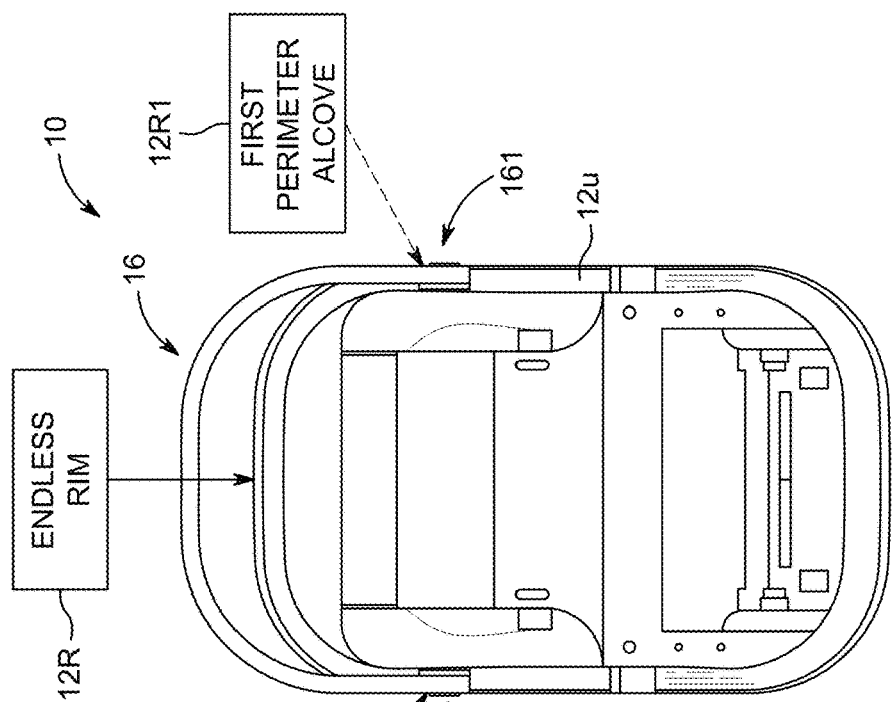
FIG. 5 is a top plan view of the infant carrier of FIGS. 3 and 4 showing that a second perimeter alcove is formed in the endless rim of the carrier shell to receive a second hub (i.e. handle end) of the carry handle so that an outwardly facing exterior side face of the first hub lies in the second perimeter alcove without substantially protruding beyond an adjacent outwardly facing exterior side wall of the endless rim.

Carrier shell 12 includes a top rim 12R that is arranged to extend along an upper perimeter of carrier shell 12. Top rim 12R includes an outwardly facing first exterior side wall 12W1 that is conceived of as generally straight in a vertical direction and an upwardly facing surface 12U as shown in FIGS. 1 and 5. A first perimeter alcove 12R1 sized to receive first handle end 161 of the pivotable carry handle 16 is formed by an indentation in the upwardly facing surface 12U and the outwardly facing first exterior side wall 12W1 of carrier shell 12 as shown in FIGS. 2 and 3 without protruding laterally outwardly as shown in FIG. 5 in a way that would cause the first handle end 161 to hit the adjacent leg or body of a caregiver holding the carry handle 16 to transport an infant restrained in carrier shell 12.

Top rim 12R of carrier shell 12 also includes an outwardly facing second exterior side wall 12W2 that is conceived of as generally straight as shown in FIG. 5. A second perimeter alcove 12R2 sized to receive second handle end 162 of the pivotable carry handle 16 is formed by an indentation in the upwardly facing surface 12U and the outwardly facing second exterior side wall 12W2 of top rim 12R of carrier shell 12 as suggested in FIG. 5 without protruding substantially laterally outwardly beyond the outwardly facing second exterior side wall 12W2 of top rim 12R in a way that would cause the second handle end 162 to hit the adjacent leg or body of a caregiver holding the carry handle 16 to transport an infant restrained in carrier shell 12.

First handle end 161 of carry handle 16 is a first hub that is mounted on one side of carrier shell 12 in the first perimeter alcove 12R1 for rotation about handle pivot axis 16A as shown in FIGS. 2 and 3. Carry handle 16 also includes a second handle end 162 that provides a second hub mounted on an opposite side of carrier shell 12 in a second perimeter alcove 12R2 for rotation about handle pivot axis 16A. Carry handle further includes a U-shaped bail 163 coupled to each of the first and second hubs 161, 162 to rotate therewith. Each hub 161, 162 remains in its companion perimeter alcove 12R1 or 12R2 when carry handle 16 occupies the extended child-carrying position without projecting laterally outwardly beyond an adjacent side 12W1 or 12W2 of carrier shell 12 to hit the leg or body of or caregiver that is carrying the infant carrier 10.

Bail 163 includes a first grip-support arm 1631 coupled to first hub 161 to rotate therewith, a second grip-support arm 1632 coupled to second hub 162 to rotate therewith, and a handgrip 1633 arranged to interconnect free ends of the first and second grip-support arms 1631, 1632 as suggested in FIGS. 2 and 5. A caregiver can move the handgrip 1633 in a first direction toward a head end of carrier shell 12 to pivot carry handle 16 in a clockwise direction about the handle pivot axis 16A to assume the retracted handle-storage position in which the U-shaped bail 163 extends around head-end of the carrier shell 12 as suggested in FIG. 3. Alternatively, the caregiver can move handgrip 163 in an opposite direction away from the head end of carrier shell 12 to pivot carry handle 16 in a counterclockwise direction about the handle pivot axis 16A to assume the extended child-carrying position in which the U-shaped bail 163 extends upwardly over the infant-supporting space 121 formed in carrier shell 12, as suggested in FIGS. 1, 2, 4, and 5, to allow the caregiver to hold carry handle 16 by handgrip 163 and transport an infant placed in the infant-supporting space 121 of carrier shell 12.

Figure 9:
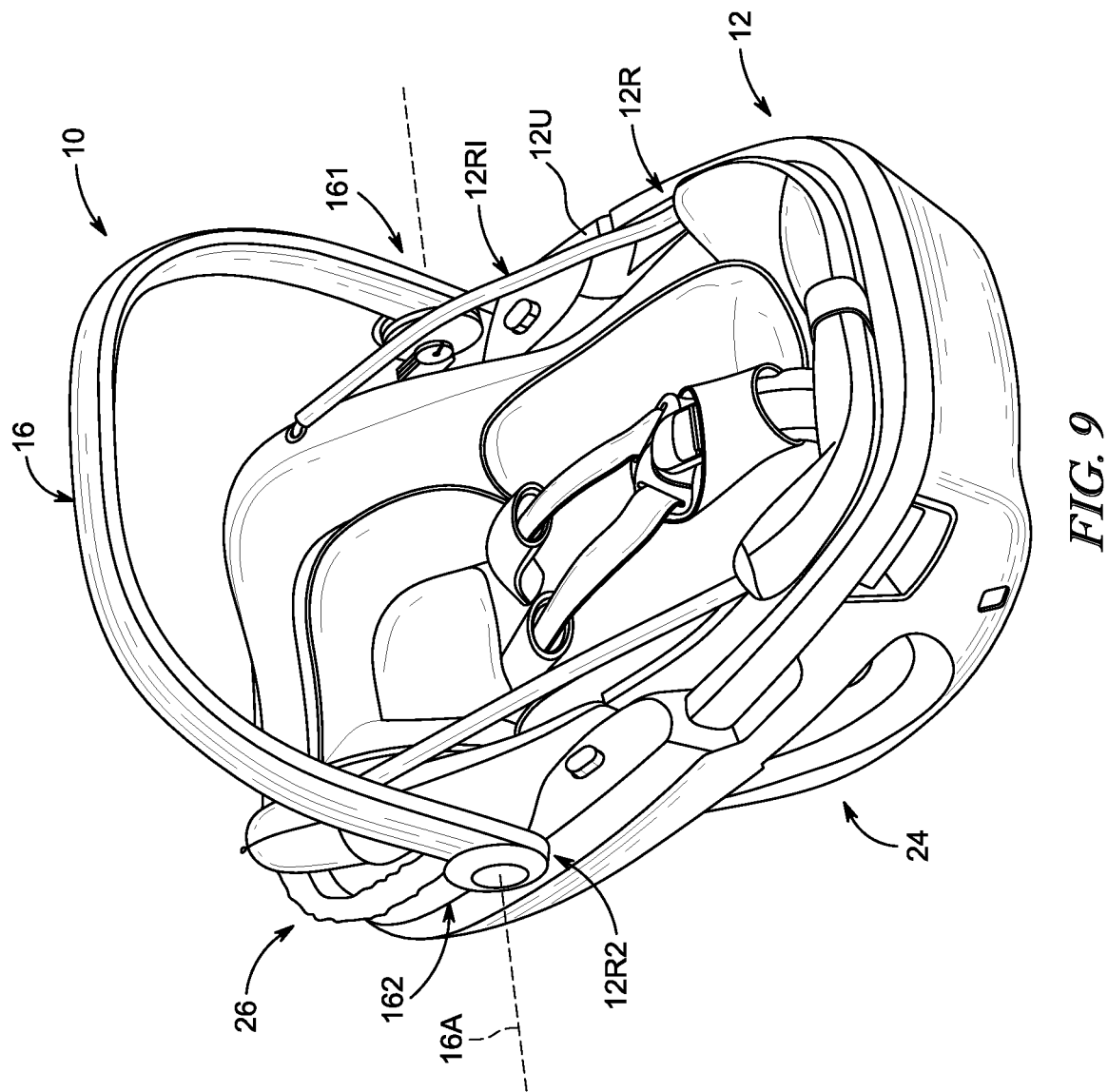
FIG. 9 is a perspective view of the infant carrier of FIGS. 1-5.
Figure 10:
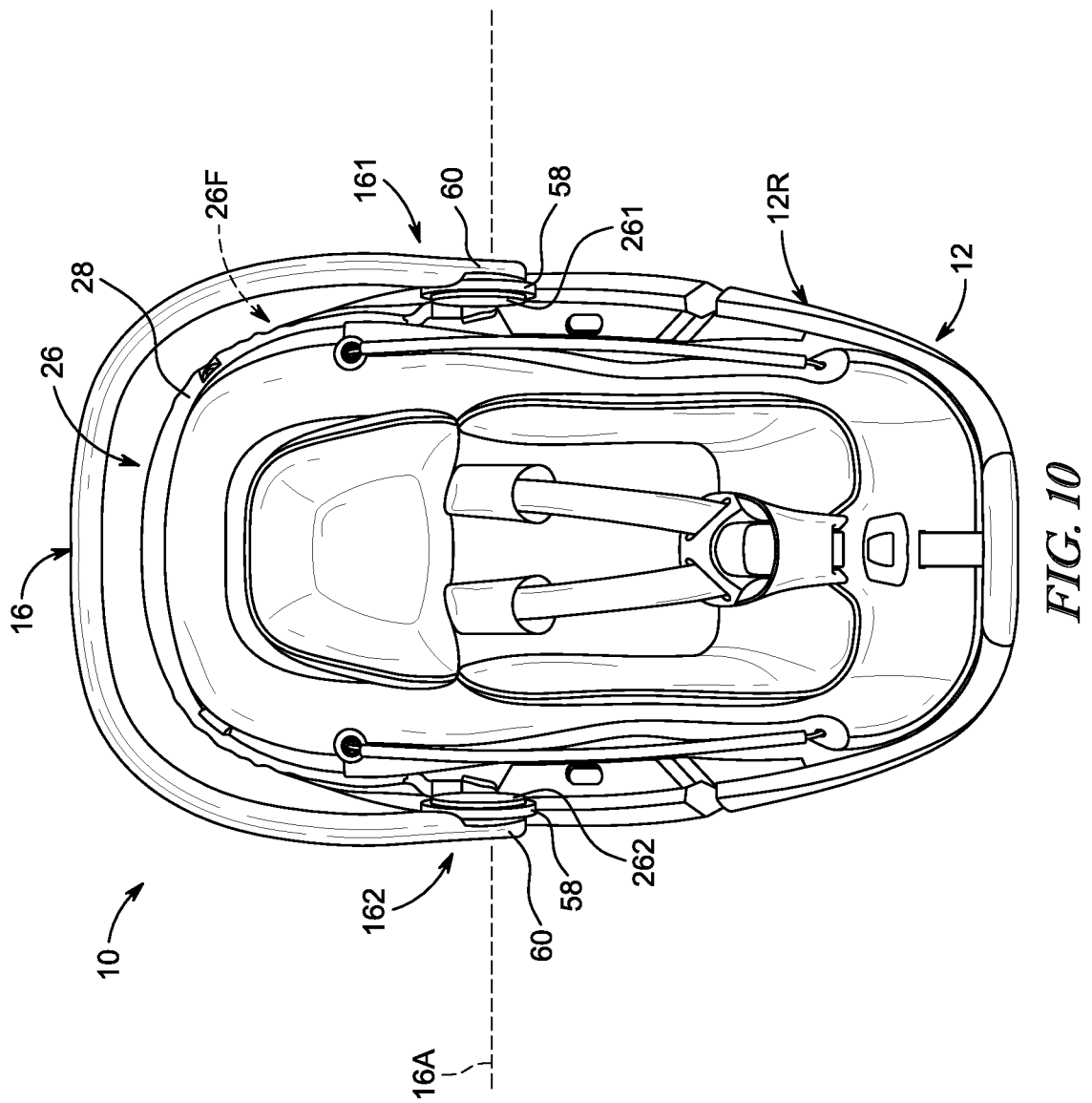
FIG. 10 is an elevation view of the infant carrier of FIGS. 1-5.
Figure 11:
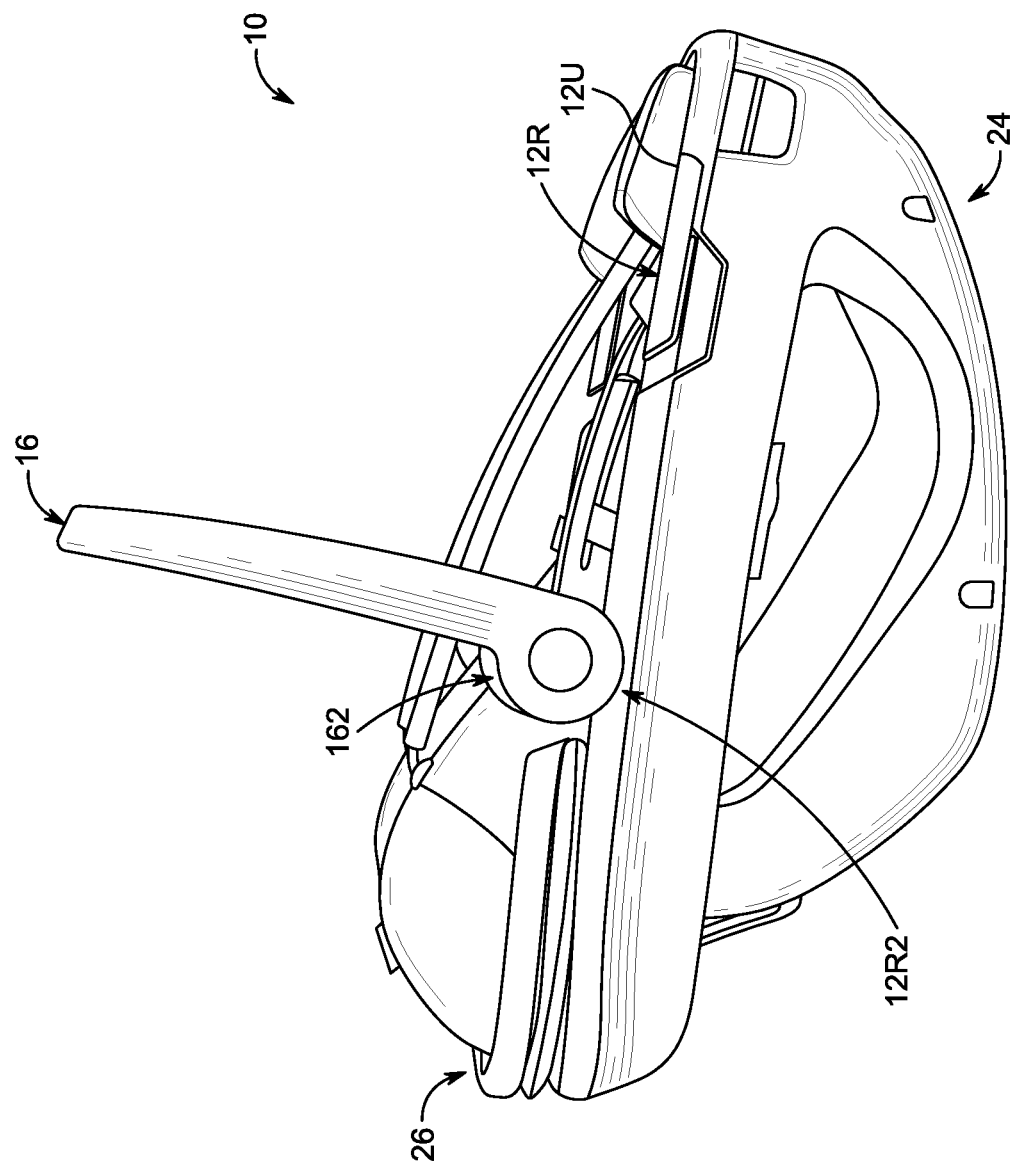
FIG. 11 is a side elevation view of the infant carrier of FIGS. 1-5.

Infant carrier 10 also includes a canopy 26 that is pivotably coupled to first and second handle hubs 161, 162 for co-axial rotation about carry handle pivot axis 16A independent of carry handle 16 as suggested in FIG. 2 and shown in FIGS. 9-11. Canopy 26 is mounted on inside surfaces of handle hubs 161, 162 and has a smaller width and height than carry handle 16 so that canopy 26 can be deployed or stored when carry handle 16 is in the retracted handle-storage position or the expanded child-carrying position. Canopy 26 includes a canopy frame 26F, a canopy cover 28, and a pair of canopy mounts 261, 262. Each canopy mount 261, 262 is mounted to a shell mount 58 of each handle hub 161, 162 to allow canopy 26 to pivot about handle pivot axis 16A. Any suitable canopy cover 28 may be coupled to canopy 26 to open and close in response to pivotable movement of canopy 26 about a handle pivot axis 16A.

Carrier shell 12 includes a basin 24 and an endless rim 12R coupled to an upper edge of basin 24 and configured to cooperate with basin 24 to form infant-supporting space 121 as suggested in FIG. 1. Endless rim 12R is formed to include an outwardly facing exterior side wall 12W1 and a recessed handle-receiver channel 12R1 interrupting the outwardly facing exterior side wall 12W1 to provide space for receiving all of the first hub 161 when carry handle 16 is pivoted to assume the extended child-carrying position. The handle-receiver channel 12R1 is formed to lie in a region located between the infant-supporting space 121 and the outwardly facing exterior side wall 12W1 as suggested in FIG. 5.

First hub 161 is arranged to extend into a first recessed handle-receiver channel 12R1 formed in a first side rail included endless rim 12R of carrier shell 12 so as minimize protrusion outwardly along handle pivot axis 16A beyond the adjacent outwardly facing first exterior side wall 12W1 of the first side rail as suggested in FIG. 5. In one example, an outwardly facing exterior side wall 12S1 of first hub 161 is inset from the outwardly facing exterior first side wall 12W1 of a portion of the first side rail of endless rim 12R that is adjacent to first hub 161 so as to increase comfort of a caregiver when the caregiver holds handgrip 1633 to carry the carrier shell 12 and the first hub 161 in close proximity to the legs or body of the caregiver.

Second hub 162 is arranged to extend into a second recessed handle-receiver channel 12R2 formed in a second side rail included endless rim 12R of carrier shell 12 so as not to protrude outwardly along handle pivot axis 16A beyond the adjacent outwardly facing second exterior side wall 12W2 of the second side rail as suggested in FIG. 5. In one example, an outwardly facing exterior side wall 12S2 of second hub 162 is flush with or inset from the outwardly facing second exterior side wall 12W2 of a portion of the second side rail of endless rim 12R that is adjacent to second hub 162 so as to increase comfort of a caregiver when the caregiver holds handgrip 1633 to carry the carrier shell 12 and the second hub 162 in close proximity to the legs or body of the caregiver.

Figure 4:
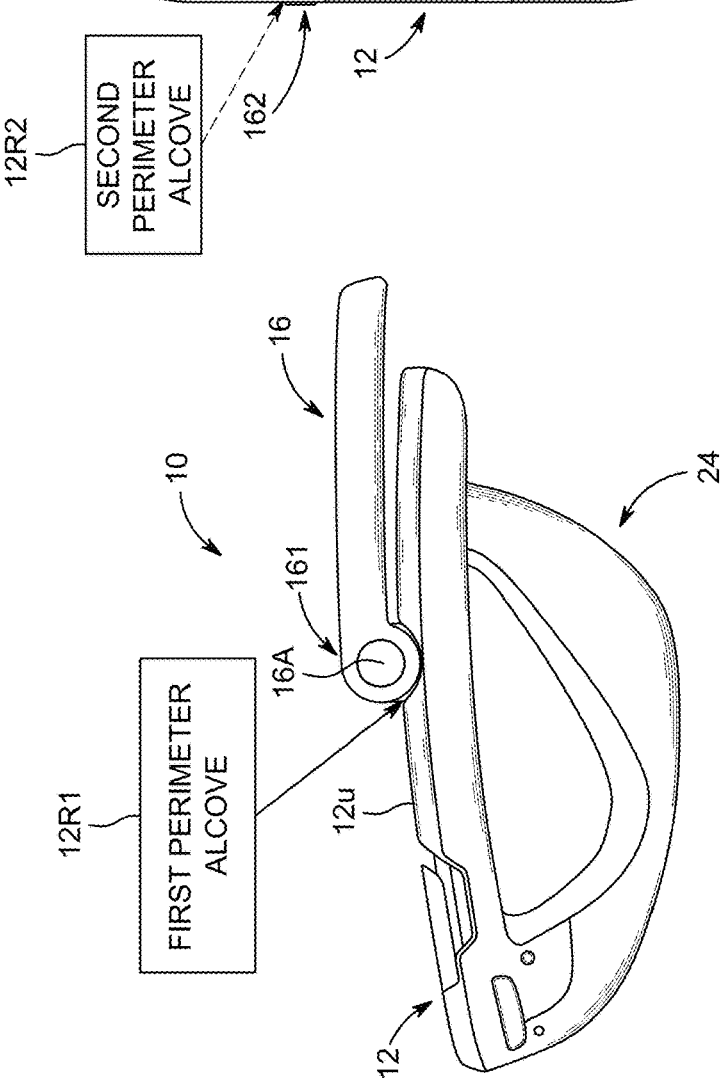
FIG. 4 is a side elevation view of the infant carrier of FIG. 3.

Each perimeter alcove 12R1, 12R2 provides a divot in upwardly facing surface 12U of top rim 12R as shown in FIG. 4. Each perimeter alcove 12R1, 12R2 has a curved shape that matches a shape of each companion handle hub 161, 162 to at least partially receive therein the handle hubs 161, 162. Clearance between handle hubs 161, 162 and surfaces defining each alcove 12R1, 12R2 is minimized so that a user or child cannot fit extremities such as fingers there between. As such, the curved shape of the surface defining each alcove have a radius with a center that is at or near a center of each handle hub 161, 162 and handle pivot axis 16A.

Carry handle 16 may be locked in the retracted handle-storage position, the extended child-carrying position, or at any position between the retracted handle-storage position and the extended child-carrying position using a handle-hub locking unit 50 included in both handle hubs 161, 162. Each handle-hub locking unit 50 includes a handle-hub mount 52, a gear lock 54, and an actuator button 56 as shown in FIGS. 6-8.

The handle-hub mount 52 includes a stationary shell mount 58 coupled to the shell body 24 in a fixed position and a movable handle mount 60 coupled to the carry handle 16. The stationary handle mount 58 is flush with or inset from the outwardly facing first exterior side wall 12W1 of a portion of the first side rail of endless rim 12R. The gear lock 54 is sized to fit between the shell mount 58 and the handle mount 60 and is biased by a spring or another suitable biasing element into engagement with the handle mount 60 to block rotation of the carry handle 16 about handle pivot axis 16A. Actuator button 56 is coupled to handle mount 60 and gear lock 54.

Figure 6:
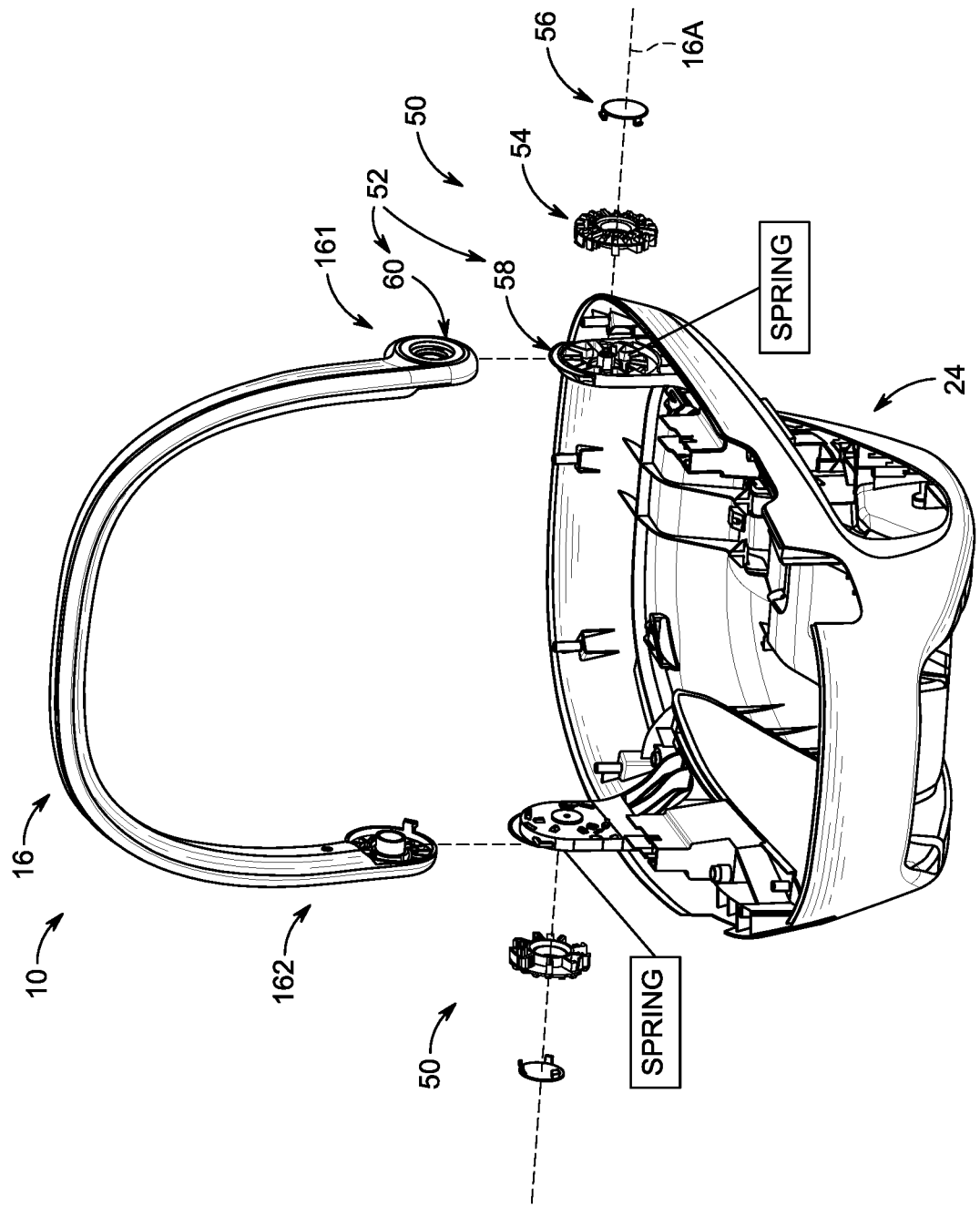
FIG. 6 is an exploded assembly view in which the carry handle is exploded away from the carrier shell to show that each of the first and the second handle hubs includes a handle-hub lock unit that is configured to lock the carry handle in the extended child-carrying position, the retracted handle-storage position, or at a position between the extended child-carrying position and the retracted handle-storage position.
Figure 7:
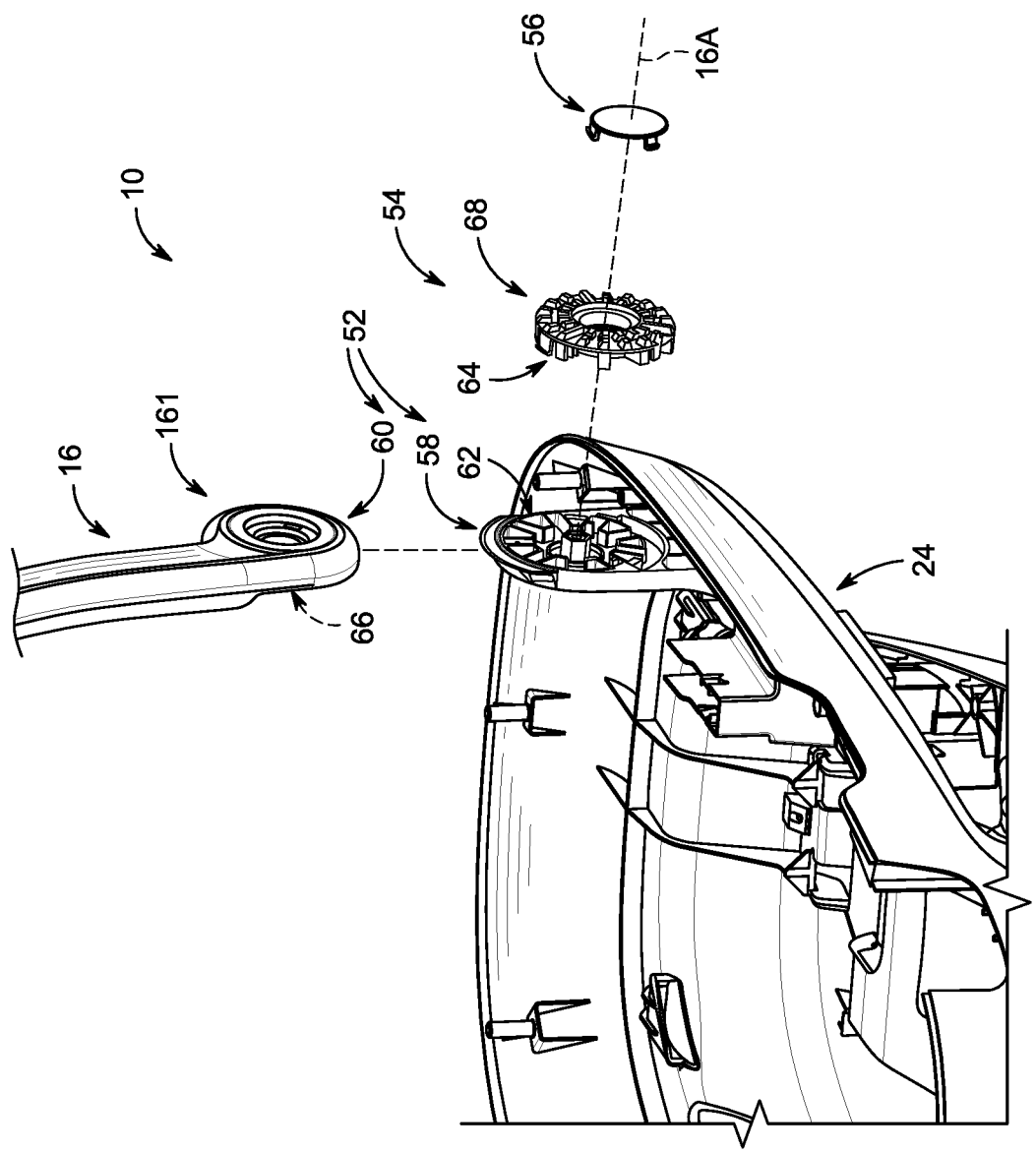
FIG. 7 is an enlarged view of a portion of the child restraint showing that each handle-hub lock unit includes a handle-hub mount coupled to the carrier shell, a gear lock having a plurality of gear teeth, and an actuator button configured to move the gear lock upon receipt of an inward actuation force so that the carry handle can rotate about the carry-handle pivot axis.
Figure 8:
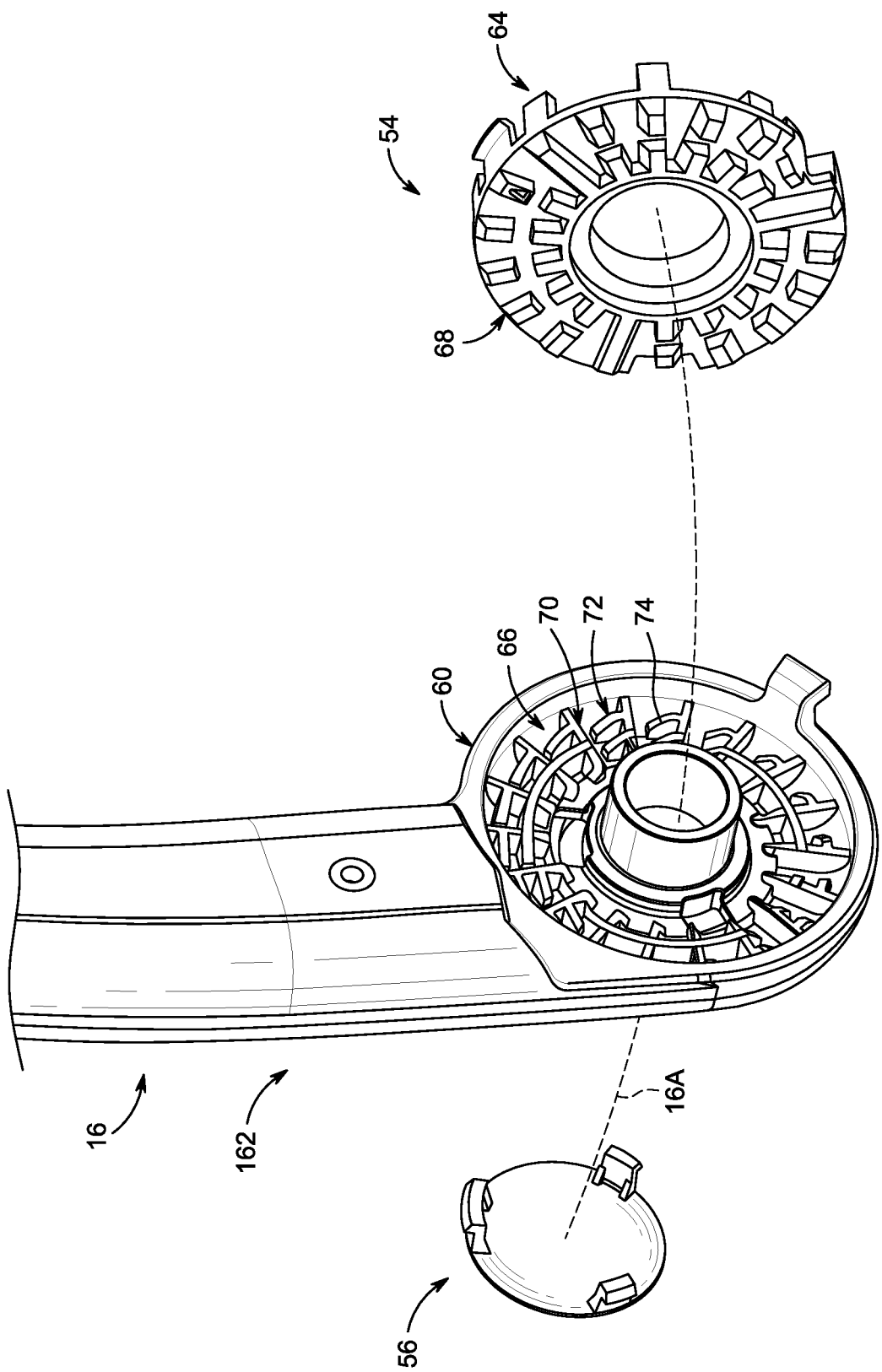
FIG. 8 is another exploded assembly view showing an interior surface of one of the handle-hub mounts including a plurality of handle-hub teeth that are configured to interlock with the gear teeth of the gear lock to block rotation of the carry handle until the actuator button is pressed inwardly to disengage the gear teeth from the handle-hub teeth.

An outer surface of actuator button 56 is exposed on a lateral side of its companion handle hub 161, 162 as shown in FIGS. 1-5 and suggested in FIGS. 6-8. Actuator button 56 may be depressed inwardly along handle pivot axis 16A to displace gear lock 54 relative to handle mount 60 to disengage gear lock 54 from handle mount 60 so that carry handle 16 may be rotated about handle pivot axis 16A.

Shell mount 58 includes a plurality of shell-mount ribs 62 spaced apart from one another circumferentially around handle pivot axis 16A as shown in FIG. 7. Gear lock 54 includes complementary gear-lock ribs 64 that mesh with shell-mount ribs 62 to block rotation of gear lock 54 about handle pivot axis 16A. Gear-lock ribs 64 are also spaced apart from one another circumferentially about handle pivot axis 16A.

Handle mount 60 includes a plurality of handle-mount ribs 66 that extend inwardly toward gear lock 54 as shown in FIG. 8. Gear lock 54 also includes a plurality of gear-lock teeth 68 formed on an opposite side of gear lock 54 from gear-lock ribs 64. Gear lock 54 has been rotated slightly in FIG. 8 so that gear-lock teeth 68 and handle-mount ribs 66 are all visible. Gear lock 54 is normally biased outwardly away from shell mount 58 and toward handle mount 60 so that handle-mount ribs 66 mesh with gear-lock teeth 68 to block rotation of carry handle 16 about the handle pivot axis 16A.

Actuator button 56 is configured to change from a locked position to a freed position to disengage gear-lock teeth 68 from handle-mount ribs 66. In the locked position, gear lock 54 is biased outwardly away from shell mount 58 and toward handle mount 60 so that handle-mount ribs 66 interlock with gear-lock teeth 68 to block rotation of carry handle 16 about the handle pivot axis 16A. In the freed position, the actuator button 56 is depressed inwardly to move gear lock 54 toward shell mount 58 and to disengage gear-lock teeth 68 from handle-mount ribs 66 of handle mount 60 so that carry handle 16 is free to rotate about handle pivot axis 16A.

Handle-mount ribs 66 may include straight blockers 70 and ramps 72 as shown in FIG. 8. Blockers 70 extend in directions that are parallel with handle pivot axis 16A. Ramps 72 are coupled to blockers 70 and each have a ramped sliding surface 74 that allows handle mount 60 and carry handle 16 to rotate relative to gear lock 54 and shell mount 58 in one direction without actuating actuator button 56. Each ramp 72 is arranged on the same circumferential side of a companion blocker 70 relative to one another. In the illustrative embodiment, the ramps 72 are located relative to each companion blocker 70 so that carry handle 16 may rotate from the retracted handle-storage position to the extended child-carrying position without actuating actuator button 56. Blockers 70 block carry handle 16 from rotating about handle pivot axis 16A from the extended child-carrying position to the retracted handle-storage position until the actuator button 56 is pressed inwardly to disengage gear-lock teeth 68 from handle-mount ribs 66.

The invention claimed is:

1. An infant carrier comprising
a carrier shell formed to include an interior region sized to support an infant and a top rim arranged to surround the interior region and having a laterally extending and upwardly facing top surface and
a carry handle mounted on the carrier shell for pivotable movement about a handle-pivot axis between and extended child-carrying position and a retracted handle-storage position,
wherein the carrier shell includes alcove means formed in the top rim for receiving opposite handle ends of the carry handle so that the handle ends are inset in the top rim, and
wherein the handle-pivot axis is located entirely above the laterally extending and upwardly facing surface of the top rim.

2. The infant carrier of claim 1, wherein the alcove means includes a first perimeter alcove formed in the top rim and that receives at least a portion of a first handle hub and a second perimeter alcove formed in the top rim and that receives at least a portion of an opposite second handle hub.

3. The infant carrier of claim 2, wherein the first and second perimeter alcoves each provide a divot in the upwardly facing surface of the top rim.

4. The infant carrier of claim 3, wherein the first and second perimeter alcoves each have a curved shape that matches a shape of each companion handle hub.

5. The infant carrier of claim 4, wherein clearance between each companion handle hub and a surface defining the first and second alcove is minimized such that the curved shape of the surface defining each alcove has a radius with a center that is at or near a center of each handle hub.

6. The infant carrier of claim 5, wherein the center of each handle hub and the surface defining each perimeter alcove is arranged along the handle pivot axis.

7. The infant carrier of claim 2, wherein the first of the handle ends is a first pivot hub that is mounted on a first side of the carrier shell in the first perimeter alcove for pivotable rotation about the handle-pivot axis, the second of the handle ends is a second pivot hub that is mounted on an opposite second side of the carrier shell in the second perimeter alcove for pivotable rotation about the handle-pivot axis, and wherein the carry handle further includes a U-shaped bail coupled to each of the first and second pivot hubs to rotate therewith about the handle-pivot axis to cause each of the first or second pivot hubs to remain in its companion perimeter alcove when the carry handle occupies the extended child-carrying position without projecting laterally outwardly from companion outwardly facing first and second exterior side walls.

8. The infant carrier of claim 7, wherein the first pivot hub and the second pivot hub each include a stationary handle mount coupled to the upwardly facing surface of the top rim in a fixed position relative to the top rim and arranged to extend upwardly away from the top surface to lie outside the first perimeter alcove and the second perimeter alcove.

9. The infant carrier of claim 8, wherein a portion of the first pivot hub and the second pivot hub lies below each companion stationary handle mount and the upwardly facing surface of the top rim in both the extended child-carrying position and the retracted handle-storage position.

10. The infant carrier of claim 7, wherein the first pivot hub includes a handle-hub locking unit including a stationary shell mount, a movable handle mount coupled to the carry handle, a gear lock arranged between the shell mount and the handle mount, and an actuator button configured to displace the gear lock relative to both the shell mount and the handle mount so that the carry handle can rotate about the handle pivot axis.

11. The infant carrier of claim 10, wherein the handle mount includes a plurality of handle-mount ribs and the gear lock includes a plurality of gear-lock teeth and the actuator button is configured to move from a normally locked position, in which the gear-lock teeth are biased to mesh with the handle-mount ribs, and a freed position, in which the actuator button displaces the gear lock relative to the handle mount to disengage the gear-lock teeth from the handle-mount ribs.

12. The infant carrier of claim 11, wherein each handle-mount rib includes a blocker that extends toward the gear lock parallel with the handle pivot axis and a ramp coupled to the blocker to allow the handle mount and the carry handle to rotate in one direction without actuating the actuator button.

13. The infant carrier of claim 7, further comprising a canopy including a canopy frame, a first canopy mount coupled to the first pivot hub, and a second canopy mount coupled to the second pivot hub.

14. The infant carrier of claim 13, wherein the first canopy mount and the second canopy mount are mounted for co-axial rotation about the carry-handle pivot axis with the carry handle and relative to the carry handle.

15. The infant carrier of claim 1, wherein the carrier shell has a forward end and a rear end and the upwardly-facing surface of the top rim has a convex shape relative to the interior region from the forward end to the rear end.

16. The infant carrier of claim 1, wherein the carry handle includes a first handle hub mounted to the carrier shell between the upwardly facing surface of the top rim and a base of a first end of the carry handle and a second handle hub mounted to the carrier shell between the upwardly facing surface of the top rim and a base of an opposite second end of the carry handle, and wherein a portion of the upwardly facing surface of the top rim is exposed on each lateral side of the carrier shell between the first handle hub and the second handle hub.

17. The infant carrier of claim 16, wherein the first handle hub and the second handle hub are positioned closer to an outwardly facing exterior surface of the carrier shell than an inwardly facing surface of the carrier shell.

18. An infant carrier comprising
a carrier shell formed to include an interior region sized to support an infant and a top rim arranged to surround the interior region and having a laterally extending and upwardly facing top surface and
a carry handle mounted on the carrier shell for pivotable movement about a handle-pivot axis between and extended child-carrying position and a retracted handle-storage position,
wherein the carrier shell is formed to include a first perimeter alcove formed in the top rim and that receives at least a portion of a first end of the carry handle and a second perimeter alcove formed in the top rim and that receives at least a portion of an opposite second end of the carry handle so that the handle ends are inset in the top rim,
wherein the carry handle further includes a U-shaped bail coupled to each of the first and second ends to rotate therewith about the handle-pivot axis to cause each of the first or second pivot hubs to remain in its companion perimeter alcove when the carry handle occupies the extended child-carrying position without projecting laterally outwardly from companion outwardly facing first and second exterior side walls,
wherein the first pivot hub and the second pivot hub each include a stationary handle mount coupled to the laterally extending and upwardly facing surface of the top rim in a fixed position relative to the top rim and arranged to extend upwardly away from the laterally extending and upwardly facing top surface to lie outside the first perimeter alcove and the second perimeter alcove, and
wherein the handle-pivot axis is located entirely above the laterally extending and upwardly facing surface of the top rim.

19. The infant carrier of claim 18, wherein a portion of the first pivot hub and the second pivot hub lies below each companion stationary handle mount and the upwardly facing surface of the top rim in both the extended child-carrying position and the retracted handle-storage position.

20. The infant carrier of claim 18, wherein the carrier shell has a forward end and a rear end and the upwardly-facing surface of the top rim has a convex shape relative to the interior region from the forward end to the rear end.

* * * * *